United States Patent Office 3,235,225
Patented Feb. 15, 1966

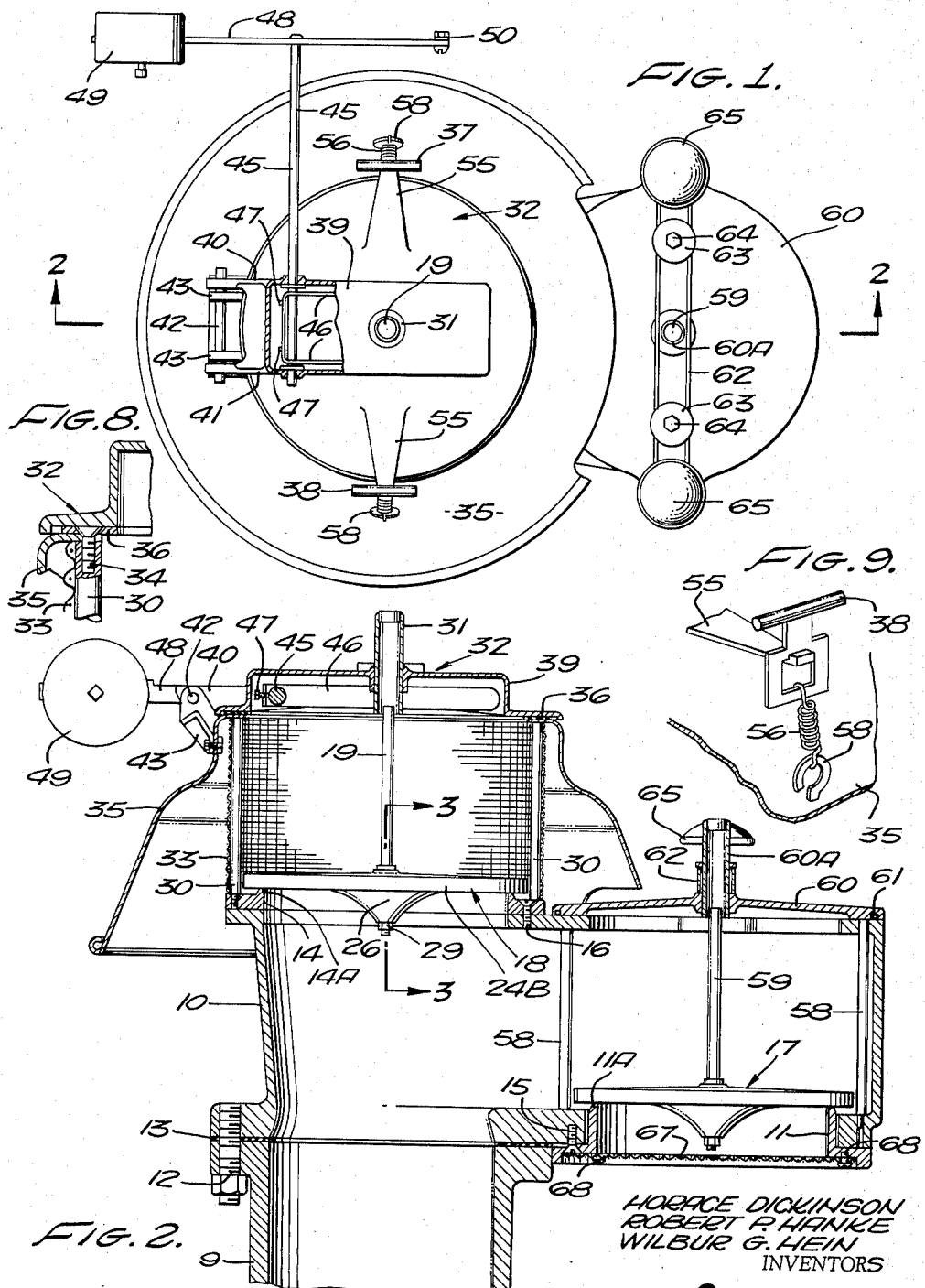

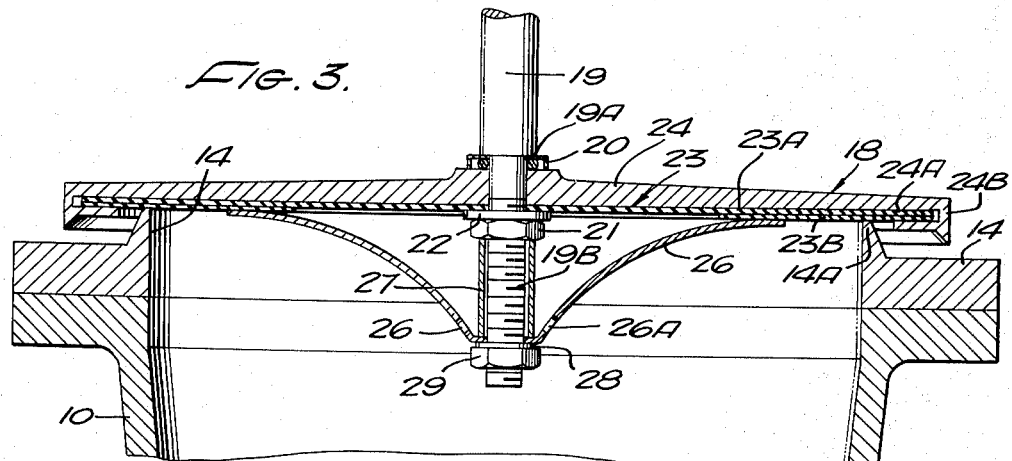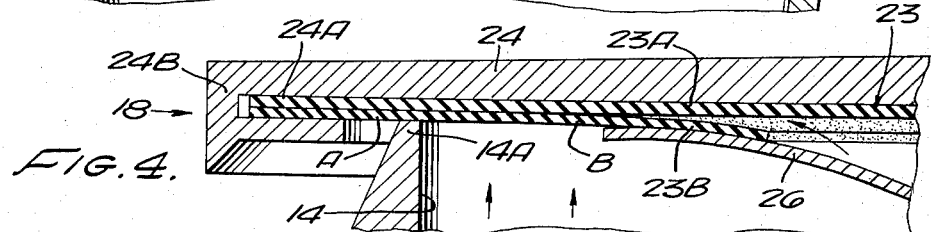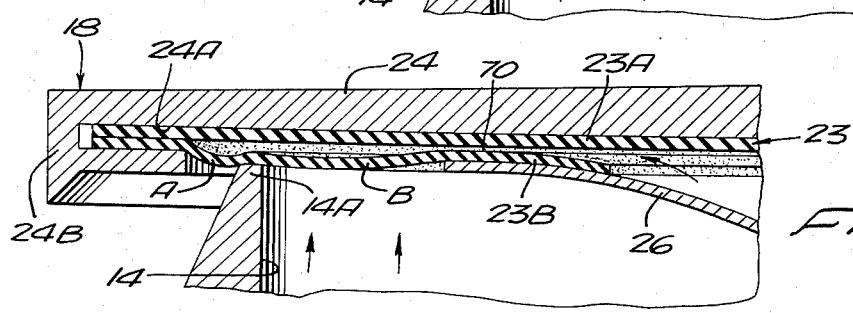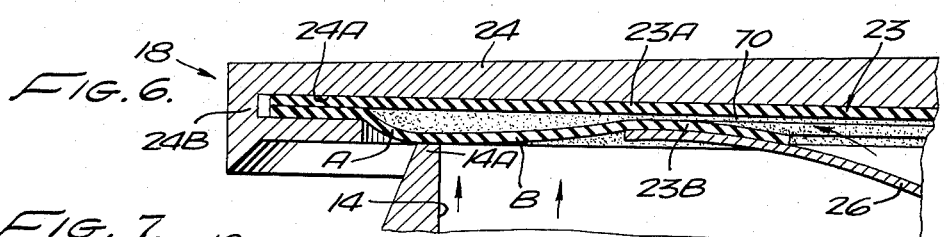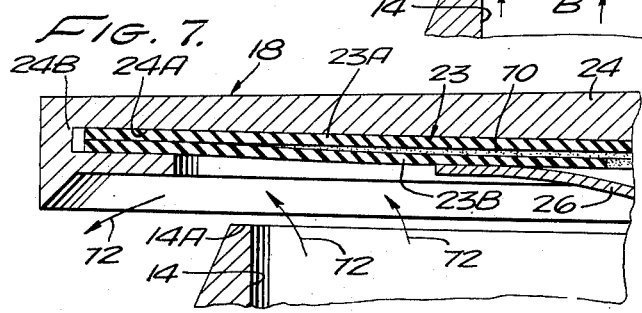

3,235,225
DIFFERENTIAL PRESSURE SEALED
DIAPHRAGM VALVE
Horace Dickinson, South Gate, Robert P. Hanke, Whittier, and Wilbur G. Hein, Los Alamitos, Calif., assignors to Varec, Inc., Compton, Calif., a corporation of California
Filed Nov. 30, 1961, Ser. No. 156,002
7 Claims. (Cl. 251—175)

The present invention relates to improved means and techniques useful in the control or regulation of various pressure media and is particularly useful in the construction of so-called pressure or breather controls that are installed on storage tanks for purposes of assuring certain pressure conditions in the storage tank.

In general, the arrangement described herein is a structure which is mountable on a storage tank and incorporates two valves, one of the valves, referred to as a pressure valve, serving to automatically vent the tank to the atmosphere upon the obtainance of a predetermined pressure in the tank and the other valve serving to automatically open when a predetermined vacuum condition exists in the tank. Thus, as long as the tank pressure is within a certain pressure range extending both above and below atmospheric pressure, the valves remain in their normally closed positions. For this purpose, each of such valves includes a pallet assembly which is normally in contact with a cooperating valve seat.

An important feature of the present invention resides in a construction that provides a tight sealing control throughout the prescribed pressure and vacuum range, and this involves a unique pallet assembly with a novel diaphragm carried thereby to function in a novel manner to achieve improved operation.

It is therefore a general object of the present invention to provide an improved control of this character that provides tight sealing throughout a predetermined pressure and vacuum range.

Another object of the present invention is to provide a new pallet assembly that involves a so-called balloon-type diaphragm.

Another object of the present invention is to provide an arrangement of this character in which a diaphragm is essentially free floating to gain important advantages.

Another object of the present invention is to provide a novel diaphragm construction for use in different controls of this character.

Another object of the present invention is to provide a valve construction featured by the fact that a diaphragm is free to move on the outer portion of a pallet member near the valve seat so as to use differential pressures developed for establishing a seal between the diaphragm and the valve seat.

Another object of the present invention is to provide a pallet assembly in which assembly of the diaphragm is facilitated for lower costs and easy maintenance purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a top plan view of a control embodying features of the present invention with parts thereof broken away to show internal construction.

FIGURE 2 is a sectional view taken generally on the line 2—2 of FIGURE 1.

FIGURE 3 is a sectional view taken substantially on the line 3—3 of FIGURE 2.

FIGURES 4, 5, 6 and 7 are enlarged sectional views similar to FIGURE 3 and serve to illustrate in that order the action of the diaphragm and ultimate opening of the pressure valve as the pressure in the tank increases.

FIGURE 8 shows a portion of the structure in FIGURE 2 in enlarged form.

FIGURE 9 is a perspective view illustrating cover fastening means shown in FIGURE 1.

Referring to the drawings, the control has a body 10 which is mountable, as illustrated in FIGURE 2, on a level flanged conduit 9 which is an extension of the tank (not shown). Usually the outlet 9 is near the tank edge and the body is installed with the vacuum intake port 11 on the body 10 toward the center of the tank. Such body 10 is mounted on the conduit 9 as, for example, by bolts 12 with a sealing gasket 13 clamped therebetween so that the interior of body 10 is in communication with the upper part of the tank. For all intents and purposes the interior of the body 10 may be considered to be at the same pressure as the interior of the tank.

The body 10 has secured thereto the aforementioned vacuum port 11 and the so-called pressure port 14 by means of fastening screws 15 and 16 respectively as illustrated. Each of these ports 11 and 14 is in the form of a circular ring having a raised edge 11A and 14A respectively that defines a valve seat on which correspondingly rest the vacuum pallet assembly 17 and pressure pallet assembly 18. Each of these pallet assemblies 17 and 18 is generally of the same construction and for that reason only the constructional features and operation of the pressure pallet assembly is described in detail in connection with FIGURES 3–7.

The pressure pallet assembly 18, as shown in FIGURES 2 and 3, has a stem 19 extending centrally therethrough, one end of the stem 19 being shouldered at 19A and threaded at 19B. A sealing washer 20 is interposed between the shouldered portion 19A and a centrally enlarged portion of the pallet member 24 and the same is maintained in a squeezed sealing condition by clamping nut 21 which abuts the washer 22, such washer 22 engaging the central portion of elastic diaphragm 23 to secure the same on the metallic pallet disc 24. A bowed annular concave metallic skirt 26, as illustrated, is also secured on the stem 19 using the following construction. A tubular sleeve 27, which serves as a spacer, is interposed between the nut 21 and the inner inturned edge of skirt 26 which is contacted on the opposite side by a washer 28, the washer in turn being contacted by the fastening nut 29 threaded on stem 19.

This previously mentioned diaphragm 23 is of special construction and, as illustrated, is in the form of a double layer "balloon" type diaphragm having a disc-shaped portion or layer 23A and a ring-shaped portion or layer 23B. The disc portion 23A, which contacts the metallic pallet element 24, has secured or sealed thereto or integrally formed therewith at its outer peripheral edge the ring-shaped elastic portion 23B and it is this ring-shaped portion 23B that contacts the stationary valve seat 14A. The joined outer circumferential edges of diaphragm portions 23A and 23B (which may be considered to be a unitary structure) are slidably recevied within an inner annular grooved portion 24A in circumferentially enlarged portion 24B of the pallet element 24 so as to achieve a so-called free floating of the circumferential portion of the composite diaphragm 23. This grooved portion or groove 24A is, as shown, in the form of an annular groove that extends radially into enlarged portion 24B.

The pallet assembly 18 is allowed to move upwardly and in such movement is guided by vertical extending guide posts 30 with stem 19 being free to move within the centrally disposed closed cylindrical sleeve portion 31 of cover member 32. These guide posts 30 have their lower ends threaded in the valve port 14. An annular screen 33 encircles the guide posts and is secured in position with respect to the upper end of guide post 30, as shown in FIGURE 8, by machine screws 34 each of which passes through spacer ring 36, an apertured portion of the bell-shaped hood member 35, and is threaded into the upper end of guide post 30. The lower end of screen 33 rests on valve port 14.

The cover assembly 32, which is spaced from the hood 35 by spacer ring 36, is pivotally mounted on the hood 35 and is releasably secured in pivoted relationship thereon by a pair of spring-loaded release handles 37 and 38. For this purpose the cover assembly 32 is formed to provide an upper, generally rectangular box-like structure 39 having two arms 40 and 41 extending therefrom, such arms 40 and 41 being pivotally mounted on a pivot pin 42 which has its ends passing through aligned aperatured portions in bracket member 43 on hood member 35.

A shaft 45 is journalled for rotation in opposite side walls of the box-like portion 39 of the cover member 32 and has secured thereto a so-called snuffer arm 45 having two legs by screws 47. An intermediate portion of arm 48 is secured to shaft 45 with one end of the arm 48 serving to mount an adjustable weight 49 and with the other end of arm 48 having attached thereto a so-called snuffer chain 50, such chain 50 being fastened so that normally the weight 49 is held by the chain 50 with the two-legged snuffer arm 46 being in its normal position as illustrated in FIGURE 2 or the chain may be released, in which case the snuffer arms 46 engage the cover 32.

It will be seen the the snuffer arms 46 may be pivoted clockwise in FIGURE 2 by pulling on chain 50 to cause such arms 46 to contact the pallet assembly 18 and to move it to closed position on port 14 as occasion may demand in use. For the present purposes the snuffer arms 46 may be considered to be always in the position illustrated in FIGURE 2.

The previously mentioned spring-loaded elements 37 and 38 are illustrated by FIGURE 9 in which the element 38 is apertured to engage an arm 55 on cover assembly 32, the element 38 being connected to one end of tension spring 56 having its other end connected to a hook member 58 on hood 35.

The vacuum pallet assembly 17 is identical in construction to pallet assembly 18 and is guided for movement by guide rods 58 suitably maintained in body 10 as illustrated with the stem 59 thereof being free to move in closed sleeve 60A on cover 60.

Access may be had to the pallet assembly 17 by removing cover member 60 which has a recessed sealing O-ring 61 and which has a strap 62 in the form of a channel member secured thereto using washers 63 and machine screws 64. Such cover 60 is released fastened to body 10 by screw-threaded hand wheels 65. A screen 67 is secured to vacuum port 11 by screws 68.

The operation of the valve with increasing pressure (likewise under decreasing pressure in case of the vacuum valve) is now described in connection with FIGURES 4, 5, 6 and 7, which show in that order progressive changes with progressive increase in pressure in the pressure valve port 14. At a point well below the valve seating, as illustrated in FIGURE 4, the weight of the pallet assembly 18 causes the entire assembly to rest on the valve seat 14A to provide a tight seal. When the tank pressure increases, as illustrated in FIGURE 5, the effective weight of the pallet assembly 18 against the seat 14A is reduced. However, at this point the tank pressure entering the space 70 between the inner diaphragm member 23A and the outer diaphragm member 23B causes the outer diaphragm member 23B to be forced tightly against the seat 14A, maintaining the tight seal therebetween. In other words, there is automatically produced a compensation for the decrease in effective weight of the pallet assembly 18.

In obtaining this compensating action it is noted that the outer diaphragm member 23B, in the form of a cantilever flap, may be considered as having two portions A and B, the portion A being annular and serving to bridge the space between the outer enlarged portion 24B of pallet member 24 and the valve seat 14A; and the portion B, also annular, serves to bridge the space between the valve seat 14A and the skirt 26 on which it loosely rests, the skirt 26 being a supporting means for the free end of the cantilever-supported diaphragm flap 23B.

Analyzing the pressure conditions on the diaphragm portions A and B, it will be observed that both sides of portion B are subjected to the tank pressure, i.e. the pressure within the pressure port 14, whereas the outer surface of portion A is subjected to atmospheric pressure and the inner surface of portion A is subjected to tank pressure. Since the tank pressure, as illustrated in FIGURE 5, is somewhat above atmospheric pressure, the portion A is bowed downwardly due to differential pressure to effect tight seal between the diaphragm flap 23B and the valve seat 14A. In achieving this deformation of the outer diaphragm member 23B, the outer circumferential peripheral portions of the joined diaphragm members 23A and 23B are free to slide in a radial direction within the grooved portion 24A.

As the tank pressure increases further, as illustrated in FIGURE 6, the pallet member 24 is raised to a higher position than shown in FIGURE 5 and the outer diaphragm member 23B remains in tight contact against the seat 14A. This condition is assured since now the difference in pressure on opposite sides of diaphragm portion A is greater. After further increase in pressure, the increased pressure causes further lifting of the pallet member 24 to the position illustrated in FIGURE 7 wherein the diaphragm portion 23B no longer contacts the seat 14A and as a consequence fluid, either gas, liquid or the same, flows as indicated by the arrows 72 between the valve seat 14A and the pallet assembly 18 to vent the tank to atmosphere. When the tank is sufficiently vented, i.e. the pressure in the tank is sufficiently reduced, the pallet assembly 18, due to its own weight, gravitates into the positions illustrated in FIGURES 3 and 4. In other words, when the force against the underside of the pallet assembly, due to the tank pressure and flow velocity, is reduced to the extent that the weight of the pallet assembly overcomes the same, the pallet assembly automatically returns to its seated position.

A like action is accomplished by like pallet assembly 17 when and as the pressure decreases in subatmospheric direction, the only essential differences residing in the fact that whereas the interior of valve port 14 is subjected to tank pressure, the interior of valve port 11 is always subjected to atmospheric pressure; but in each case there are two portions A and B, as illustrated in FIGURES 5–7, with a differential pressure being developed on the portion A to maintain the valve seating during initial raising of the pallet assembly.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a valve structure of the character described, an annular metal valve seat; a pallet assembly engageable with said seat and movable with respect thereto; said pallet assembly including: a disc-shaped metal pallet member having a circumferential marginal edge portion overlying and extending radially outwardly from said seat, said marginal edge portion having an outer circumferential groove therein which extends radially inwardly into said marginal edge portion, a double layer elastic diaphragm having an inner layer and an outer layer, said inner layer being in the form of a disc contacting said pallet member with a center portion of said disc being secured centrally of said pallet member and with the circumferential portion of said disc extending into said groove, said outer layer being in the form of a ring having the outer circumferential portion thereof also extending into said groove and being joined to said disc near the outer circumferential edge of said disc, said disc and ring having their outer circumferential edges slidably received in said groove, an annular skirt centrally carried by said pallet member and having its outer circumferential edge spaced inwardly from said annular valve seat to define an annular space therebetween, said ring bridging said annular space with the inner circumferential portion of said ring being loosely mounted on said skirt, said skirt being apertured to communicate pressure existing internally of the valve seat to a region between said inner and outer layers, said outer layer in the form of a ring having an annular portion which extends radially outwardly of said valve seat so as to be subjected to pressure outside of said annular valve seat.

2. A structure as set forth in claim 1 in which said valve seat is mounted on a pressure-retaining body and said valve seat extends outwardly of said body with said annular portion of said outer layer being subjected to atmospheric pressure and said skirt communicating internal pressures in said body to the region between said inner and outer layers.

3. A structure as set forth in claim 1 in which said valve seat is mounted on a pressure-retaining body and said valve seat extends inwardly of said body with said annular portion of said outer layer being subjected to pressures in said body and said skirt communicating atmospheric pressure to the region between said inner and outer layers.

4. A valve structure of the character described, an annular valve seat; a pallet assembly engageable with said seat and movable with respect thereto; said pallet assembly including: a disc-shaped pallet member having a circumferential marginal edge portion overlying and extending radially outwardly from said seat, said marginal edge portion having an annular circumferential groove therein which extends radially inwardly into said marginal edge portion, annular diaphragm means centrally mounted on said pallet member and having a circumferential peripheral edge slidably received in said groove, diaphragm supporting means mounted on said pallet member internally of said valve seat and spaced therefrom, said diaphragm means including a cantilever flap portion thereof which has its free end loosely engageable with said supporting means with a portion thereof bridging the space between said valve seat and said supporting means with both sides of said bridging portion of said flap being subjected to pressure internally of said valve seat, and said flap having an additional portion that extends outwardly of said valve seat with one side thereof being subjected to pressures internally of said valve seat and with the other side thereof being subjected to pressures externally of said valve seat.

5. In a valve structure of the character described, a valve seat, a valve member movable with respect to said seat and having a portion overlying and extending outwardly generally in a direction in the plane of said valve seat, diaphragm supporting means carried by said member internally of said valve seat, diaphragm means contacting said valve seat and slidably mounted in said member portion and having a first portion bridging said member portion and said valve seat and a second portion of said diaphragm means bridging said valve seat and said supporting means, said second portion loosely contacting said supporting means, said first diaphragm portion having one of its sides subjected to pressure internally of said valve seat and the other one of its sides subjected to pressure externally of said valve seat, said second diaphragm portion having both of its sides subjected to pressure internally of said valve seat.

6. A valve structure comprising a valve member movable with respect to a valve seat and having a portion overlying and extending outwardly generally in the plane of said valve seat, the valve member carrying a diaphragm which is slidable between the outer circumferential parts of the valve member and which consists of a first portion bridging said member portion and said valve seat and having one of its sides subjected to the pressure externally of said valve seat, and a second portion which is integrally formed with said first portion and is positioned internally of said valve seat and which is provided with a central opening via which this portion is subjected on both sides to the pressure internally of the valve seat and is movable in a radial direction, characterized in that the second diaphragm portion rests with its inner circumferential edge on a support connected to the valve member, wherein an opening is formed, which equalizes the pressure internally and externally of the support.

7. A valve structure comprising a valve member movable with respect to a valve seat and having a portion overlying and extending outwardly in the plane of said valve seat, said valve member having an annular, single open-ended grooved portion, a flexible diaphragm including a first generally planar portion and a second generally planar portion partially overlying said first planar portion and joined thereto at adjacent circular peripheral regions of the same, said circular peripheral regions being disposed within and being slidably mounted in said annular grooved portion for radial movement of said diaphragm generally parallel to said plane of said valve seat, said first diaphragm portion bridging said member portion and said valve seat and having one of its sides subjected to the pressure externally of said valve seat, said second diaphragm portion contacting said valve seat and having a first region of the same positioned internally of said valve seat subjected on both sides to the pressure internally of the valve seat, said second diaphragm portion having a second region of the same extending outside of said valve seat, said first and second diaphragm portions defining an expansible pocket which extends from said joined circular peripheral regions to a point adjacent said valve seat with said pocket being expanded in accordance with the difference in internal and external pressures, said joined circular regions being free to move in said grooved portion during expansion of said pocket.

References Cited by the Examiner
UNITED STATES PATENTS

| 2,101,991 | 12/1937 | Finley | 251—175 X |
| 2,879,786 | 3/1959 | Heideman | 251—175 X |
| 2,928,413 | 3/1960 | Hansen | 251—175 X |
| 3,055,629 | 9/1962 | Jurs | 251—175 X |

FOREIGN PATENTS 184,911   8/1922   Great Britain.

ISADOR WEIL, *Primary Examiner.*

CLARENCE R. GORDON, *Examiner.*